United States Patent
Pan et al.

(10) Patent No.: US 8,797,689 B1
(45) Date of Patent: Aug. 5, 2014

(54) DISK DRIVE HEAD SUSPENSION ASSEMBLY WITH PIEZO ELEMENT STRESS RELIEF FEATURES

(71) Applicant: Western Digital Technologies, Inc., Irvine, CA (US)

(72) Inventors: Tzong-Shii Pan, San Jose, CA (US); Kia Moh Teo, San Jose, CA (US); Wing C. Shum, San Mateo, CA (US); Yanning Liu, San Ramon, CA (US); Mukund Vijay, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 36 days.

(21) Appl. No.: 13/683,974

(22) Filed: Nov. 21, 2012

(51) Int. Cl.
*G11B 5/56* (2006.01)

(52) U.S. Cl.
USPC ...................................................... 360/294.4

(58) Field of Classification Search
CPC .............................. G11B 5/5552; G11B 5/482
USPC ...................... 360/294.1, 294.3, 294.4, 244.5
See application file for complete search history.

(56) References Cited

U.S. PATENT DOCUMENTS

| | | |
|---|---|---|
| 6,157,522 A | 12/2000 | Murphy et al. |
| 6,188,548 B1 | 2/2001 | Khan et al. |
| 6,297,936 B1 | 10/2001 | Kant et al. |
| 6,335,848 B1 | 1/2002 | Mei |
| 6,421,211 B1 | 7/2002 | Hawwa et al. |
| 6,661,619 B2 | 12/2003 | Nishida et al. |
| 6,765,761 B2 | 7/2004 | Arya |
| 6,856,075 B1 * | 2/2005 | Houk et al. ................... 310/348 |
| 7,177,119 B1 * | 2/2007 | Bennin et al. .............. 360/294.6 |
| 7,280,319 B1 | 10/2007 | McNab |
| 8,149,545 B1 | 4/2012 | Chai et al. |
| 8,339,748 B2 * | 12/2012 | Shum et al. ................ 360/245.8 |
| 8,526,142 B1 * | 9/2013 | Dejkoonmak et al. ..... 360/294.4 |
| 8,665,567 B2 * | 3/2014 | Shum et al. ................ 360/294.3 |
| 2010/0073825 A1 | 3/2010 | Okawara |
| 2010/0177445 A1 * | 7/2010 | Fuchino ........................ 360/294 |
| 2010/0195252 A1 | 8/2010 | Kashima |

* cited by examiner

*Primary Examiner* — Angel Castro

(57) ABSTRACT

A head suspension assembly for a disk drive includes a mounting plate that may include an annular swage boss. A load beam is attached to and extends from the mounting plate in a longitudinal direction. A first piezoelectric element is disposed within a first piezoelectric element receiving window in the mounting plate. The load beam includes a first etched region that is elongated in a transverse direction that is transverse to the longitudinal direction. The first etched region neighbors the first piezoelectric element and is disposed closer to the annular swage boss than is the first piezoelectric element.

21 Claims, 4 Drawing Sheets

DISK DRIVE HEAD SUSPENSION ASSEMBLY WITH PIEZO ELEMENT STRESS RELIEF FEATURES

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read may be referred to as "read heads" herein, regardless of other devices or functions that the read head may also include or perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media.

The HGA typically also includes a head suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each head suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by gold ball bonding), and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric microactuators that are affixed to a component of the suspension assembly. For example, the piezoelectric microactuator may be affixed to the mounting plate or an extension thereof, and/or the load beam or an extension thereof, or to the flexure tongue (a.k.a. the "gimbal tongue") to which the read head is bonded).

Generally, the further the microactuator is disposed from the read head on the suspension assembly, the less bandwidth it can provide. This is due to the dynamics introduced by the intermediate structure of the suspension assembly. On the other hand, the closer the microactuator is disposed to the read head on the suspension assembly, the lesser stroke it can typically provide.

However, when the microactuator is affixed to the mounting plate and/or to the load beam, the advantage of increased stroke may also be partially negated by failures and reliability concerns associated with mechanical stresses. Such mechanical stresses may result from handling or process steps during HGA and/or disk drive manufacture, or may result from exposure of the disk drive to mechanical shocks after manufacture. Such mechanical stresses may undesirably cause cracking of piezoelectric subcomponents of the microactuator. Therefore, there is a need in the information storage device arts for a microactuator design that can relieve or isolate internal mechanical stresses, while still providing an advantageous compromise between stroke and bandwidth for fine actuation.

DETAILED DESCRIPTION OF EXEMPLARY EMBODIMENTS

Figure 1:
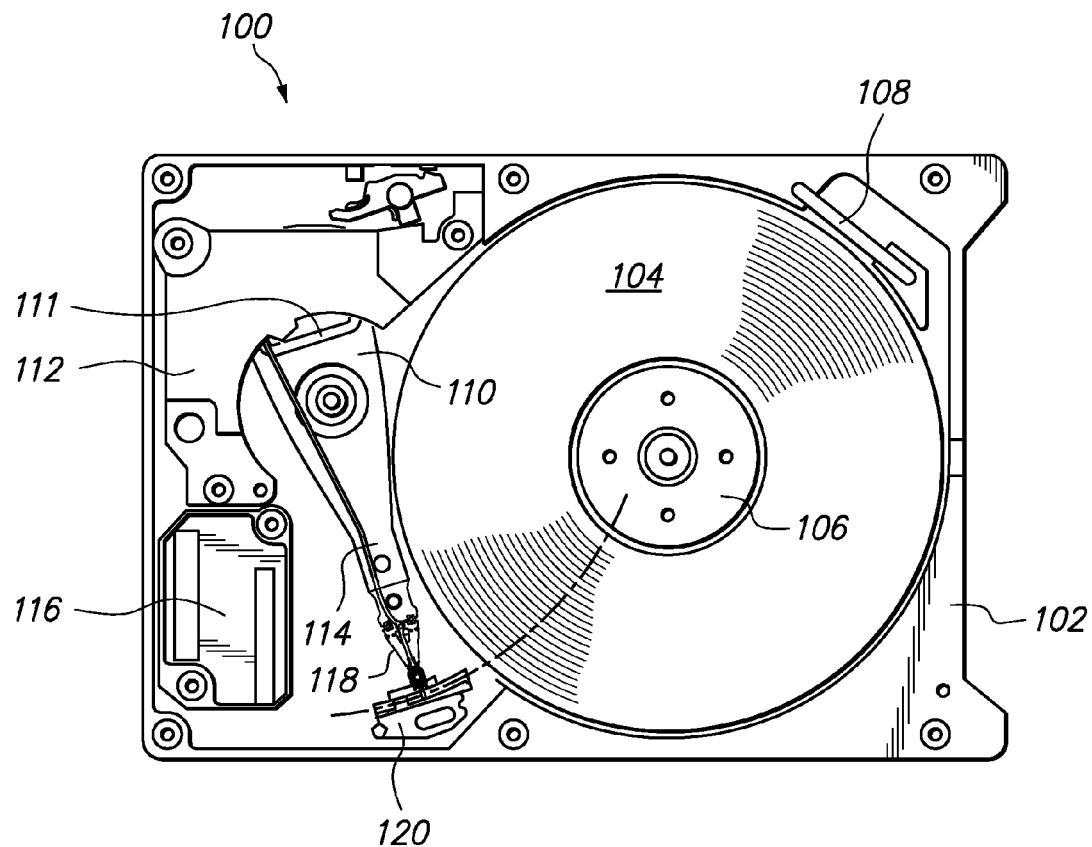
FIG. 1 is a top view of a disk drive according to an embodiment of the present invention.

FIG. 1 is a top view of a disk drive 100 according to an embodiment of the present invention. The disk drive 100 includes a disk drive base 102. The disk drive 100 further includes a spindle 106, rotably mounted on the disk drive base 102, for rotating at least one disk 104 that is mounted on the spindle 106. The rotation of the disk(s) 104 establishes air flow through optional recirculation filter 108. In certain embodiments, disk drive 100 may have only a single disk 104, or alternatively, two or more disks.

The disk drive 100 further includes a voice coil actuator 110 that may be pivotably attached to the disk drive base 102. The voice coil actuator 110 includes an actuator arm 114 that supports a head gimbal assembly (HGA) 118 which is attached to the actuator arm 114. The voice coil actuator 110 also includes an electrically conductive actuator coil 111, positioned within the field of a permanent magnet 112 to form a voice coil motor (VCM). During disk drive operation, an electrical current may be driven through the actuator coil 111 to move the voice coil actuator 110 through a limited angular range, towards a desired coarse position (e.g. angular position). For example, the HGA 118 may thereby be desirably coarsely positioned relative to one or more tracks of information on the disk 104.

Preferably the disk drive 100 will include one HGA 118 per disk surface, but depopulated disk drives are also contemplated in which fewer HGAs are used. Under non-operating conditions the HGA(s) 118 may be parked on ramp 120, for example to avoid contact with the disk 104 when it is not spinning. Electrical signals to/from the HGA 118 are carried to other drive electronics, in part via a flex cable (not shown) and a flex cable bracket 116.

Figure 2:
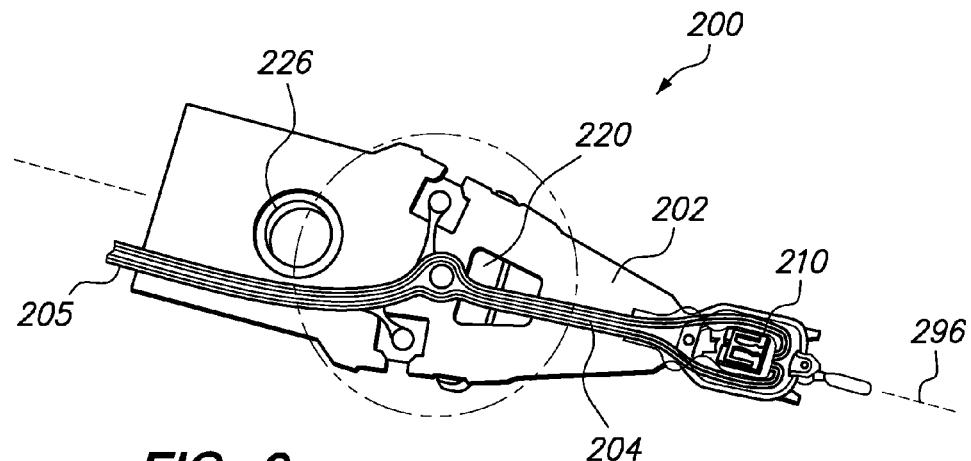
FIG. 2 is a bottom view of a head gimbal assembly (HGA) according to an embodiment of the present invention.
Figure 3:
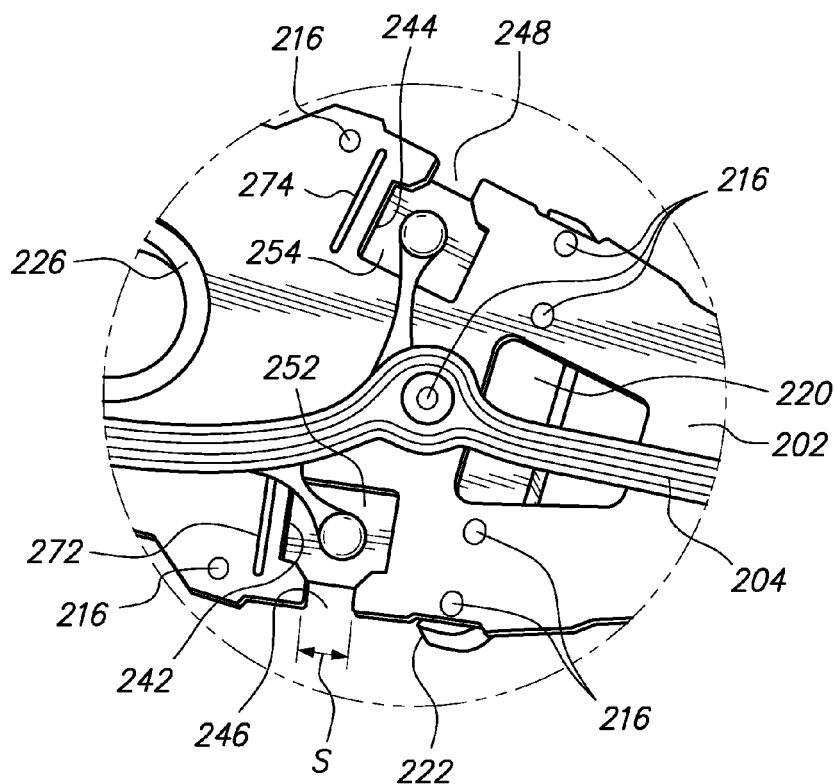
FIG. 3 is an expanded view of a circled portion of the HGA of FIG. 2.

FIG. 2 is a bottom perspective view of a HGA 200 according to an embodiment of the present invention. FIG. 3 is an expanded view of the portion of the HGA 200 that is shown within a dashed circle in FIG. 2. Now referring additionally to FIGS. 2 and 3, the HGA 200 includes a mounting plate 220 attached to the actuator arm (e.g. actuator arm 114 of FIG. 1). The HGA 200 also includes a load beam 202 attached to and extending from the mounting plate 220 in a load beam longitudinal direction 296. The HGA 200 also includes a read head 210 supported by the load beam 202. The read head 210 may read and write data from and to an adjacent surface of a magnetic disk (e.g. disk 104 of FIG. 1).

The read head 210 may include a slider substrate having an air bearing surface (facing the viewer in FIG. 2) and an opposing top surface (not visible in the view of FIG. 2). The slider substrate preferably comprises AlTiC, although another ceramic or silicon might also be used. The read head 210 may also include a read/write transducer (too small to be seen in the scale of FIG. 2) that is preferably an inductive magnetic write transducer merged with a magneto-resistive read transducer (e.g. a tunneling magneto-resistive read transducer).

In the embodiment of FIGS. 2 and 3, a purpose of the load beam 202 may be to provide limited vertical compliance for the read head 210 to follow vertical undulations of the surface of a disk (e.g. disk 104 of FIG. 1) as it rotates, and to preload the air bearing surface of the read head 210 against the disk surface by a preload force that is commonly referred to as the "gram load."

In the embodiment of FIGS. 2 and 3, the HGA 200 also includes a laminated flexure 204. A first purpose of the laminated flexure 204 is to provide compliance for the read head 210 to follow pitch and roll angular undulations of the surface of the disk (e.g. disk 104 of FIG. 1) as it rotates, while restricting relative motion between the read head 210 and the load beam 202 in the lateral direction and about a yaw axis. A second purpose of the laminated flexure 204 may be to provide a plurality of electrical paths to facilitate signal transmission to/from the read head 210. For that second purpose, the laminated flexure 204 may include a plurality of electrically conductive traces that are defined in an electrically conductive (e.g. copper) sub-layer of the laminated flexure 204. Such electrically conductive traces may be insulated from a support layer (e.g. stainless steel) by a dielectric layer (e.g. polyimide). The electrically conductive traces may extend away from the read head 210 along a flexure tail 205 of the laminated flexure 204, to reach a portion of the flex cable (not shown) that includes a preamplifier chip near the body of the actuator (e.g. actuator 110 of FIG. 1).

In the embodiment of FIGS. 2 and 3, the laminated flexure 204 may be attached to the load beam, and the load beam 202 may be attached to a mounting plate 220, via a plurality of spot welds 216. The load beam 202 and mounting plate 220 may be made of stainless steel, for example. The load beam 202 and mounting plate 220 may together be referred to as a heads "suspension assembly." Accordingly, the mounting plate 220 may also be referred to as a suspension assembly mounting plate 220.

In certain preferred embodiments, the suspension assembly mounting plate 220 includes an annular swage boss 226 to facilitate attachment of the suspension assembly to an actuator arm (e.g. actuator arm 114) by the well-known conventional attachment process known as swaging. In that case, the suspension assembly mounting plate 220 may also be referred to as a "swage mounting plate." Note that, after the laminated flexure 204 is attached to the load beam 202, the laminated flexure 204 may be considered to also pertain to the "suspension assembly." However, before the laminated flexure 204 is attached to the load beam 202, the term "suspension assembly" may refer to only the load beam 202 and the mounting plate 220.

Figure 4:
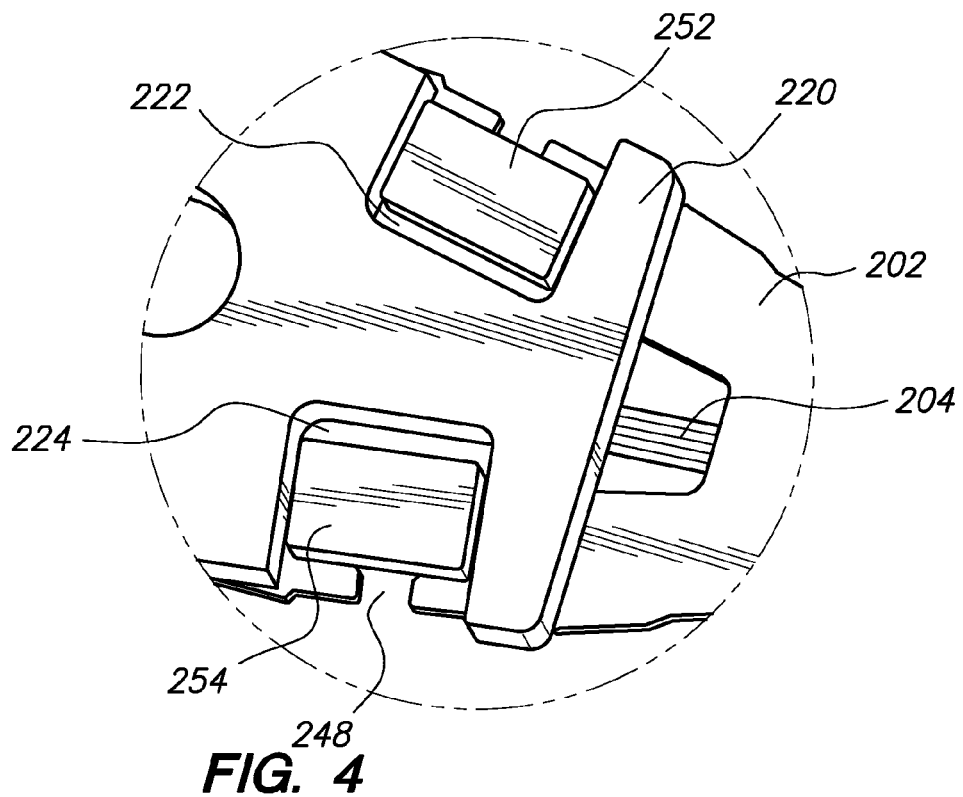
FIG. 4 is a top view of a portion of an HGA that includes a microactuator according to an embodiment of the present invention.

FIG. 4 is a top view of the expanded portion of the HGA 200 for which the bottom view is shown in FIG. 3. In the embodiment of FIGS. 2-4, the HGA 200 is depicted to also include a first piezoelectric element 252 disposed within a first piezoelectric element receiving window 222 in the mounting plate 220. The load beam 202 includes a first etched region 272 that is elongated in a transverse direction that is transverse to the longitudinal direction 296. In this context, a "transverse" direction is a direction that is within 25 degrees of being perpendicular to the longitudinal direction 296, and "elongated" means substantially longer than wide in the direction of elongation (e.g. in this case, having a dimension in the transverse direction that is substantially greater than in the longitudinal direction 296).

Also, in the context of the embodiment of FIGS. 2-4, an "etched region" is a region in which material has been removed causing a recession in the surface or a through opening (e.g. a through slot). For example, a surface that is flush with the surrounding material does not qualify as an "etched region." In the embodiment of FIGS. 2-4, the first etched region 272 is a through slot. Note that one of ordinary skill can determine whether an opening or region is an etched opening or region from the structure alone (e.g. inspection of the edges) without first being told what process was used to create such opening. Hence, the term "etched region" is properly considered as a structural limitation herein, rather than a merely as a process limitation.

As shown in FIG. 3, the first etched region 272 neighbors the first piezoelectric element 252. Preferably but not necessarily, the first etched region may have a lateral span of 0.5 to 1.25 times that of the first piezoelectric element 252. The first etched region 272 is also shown to be located closer to the actuator arm than is the first piezoelectric element 252. Specifically, this can be seen because the first etched region 272 is shown in FIG. 3 to be located closer to the swage boss 226

(to which the actuator arm is connected) than is the first piezoelectric element 252. Note that the actuator arm would lie to the left of the swage boss 226 in FIGS. 2 and 3. In certain embodiments, such positioning and preferred range of lateral span may advantageously reduce the stress experienced by the first piezoelectric element 252, and thereby enhance disk drive reliability by delaying or avoiding fractures in the first piezoelectric element 252.

Likewise, in the embodiment of FIGS. 2-4, the HGA 200 is depicted to also include a second piezoelectric element 254 disposed within a second piezoelectric element receiving window 224 in the mounting plate 220. The load beam 202 includes a second etched region 274 that is elongated in a transverse direction that is transverse to the longitudinal direction 296. The second etched region 274 is shown in FIG. 3 to be a through slot that neighbors the second piezoelectric element 254. Preferably but not necessarily, the second etched region 274 may have a lateral span of 0.5 to 1.25 times that of the second piezoelectric element 254. The second etched region 274 is also shown in FIG. 3 to be located closer to the actuator arm than is the second piezoelectric element 254. This can be seen because the second etched region 274 is shown in FIG. 3 to be located closer to the swage boss 226 (to which the actuator arm is connected) than is the second piezoelectric element 254. In certain embodiments, such positioning and preferred range of lateral span may advantageously reduce the stress experienced by the second piezoelectric element 254, and thereby enhance disk drive reliability by delaying or avoiding fractures in the second piezoelectric element 254.

Each of the first and second piezoelectric elements 252, 254 may optionally comprise one or more of many known piezoelectric materials, for example lead zirconate titanate, lead scandium tantalite, lanthanum gallium silicate, lithium tantalite, barium titanate, gallium phosphate and/or potassium sodium tartrate. Each of the first and second piezoelectric elements 252, 254 may optionally be a laminated piezoelectric element that comprises a plurality of layers of piezoelectric material disposed between pairs of a plurality of electrically conductive electrode layers (e.g. gold layers).

In the embodiment of FIGS. 2-4, the load beam 202 preferably includes a through-opening over the first piezoelectric element 252. In the embodiment of FIGS. 2-4, the through-opening has an inner periphery 242 that includes a gap 246 that is disposed along an outer edge of the first piezoelectric element 252. Such outer edge faces away from a bisecting centerline of the load beam 202 that is parallel to (and in the view of FIGS. 2 and 3 coincident with) the longitudinal direction 296. In the embodiment of FIGS. 2-4, the gap 246 has a span S that is preferably no more than half of a length of the first piezoelectric element 252 measured in the longitudinal direction 296. In certain embodiments, the largest face of the first piezoelectric element 252 defines a piezoelectric element surface area, and the load beam 202 overlaps the first piezoelectric element 252 by an overlap area that is preferably in the range 10% to 40% of the piezoelectric element surface area. In certain embodiments, the foregoing gap span and overlap area ranges may advantageously enhance the stroke versus bandwidth tradeoff for fine actuation by the first piezoelectric element 252, while acceptably meeting mechanical shock robustness requirements.

In the embodiment of FIGS. 2-4, the load beam 202 preferably likewise includes a through-opening over the second piezoelectric element 254. In the embodiment of FIGS. 2-4, the through-opening has an inner periphery 244 that includes a gap 248 that is disposed along an outer edge of the second piezoelectric element 254. Such outer edge faces away from a bisecting longitudinal centerline of the load beam 202. In the embodiment of FIGS. 2 and 3, the gap 248 preferably spans no more than half of a length of the second piezoelectric element 254 measured in the longitudinal direction 296. In certain embodiments, the foregoing gap span range may advantageously enhance the stroke versus bandwidth tradeoff for fine actuation by the second piezoelectric element 254, while acceptably meeting mechanical shock robustness requirements.

As shown in the embodiment of FIGS. 2-4, each of the first and second piezoelectric elements 252, 254 may be electrically connected to at least one of the plurality of conductive traces of the laminated flexure 204 (which also extends conductive traces to the read head 210). In certain embodiments, a conductive adhesive, solder, ribbon leads, and/or gold wire stitching may be used to make such electrical connections to the piezoelectric elements 252, 254. However, if solder is used, then it may be desirable for the solder to have a low temperature melting point, since it may be undesirable for it to get so hot that the piezoelectric material becomes depolarized. In certain embodiments, a side of each piezoelectric element 252, 254 may be grounded via electrical conduction through metal (e.g. stainless steel) parts of the suspension assembly (used as the ground conductor rather than or in addition to a ground trace of the laminated flexure 204).

Figure 5:
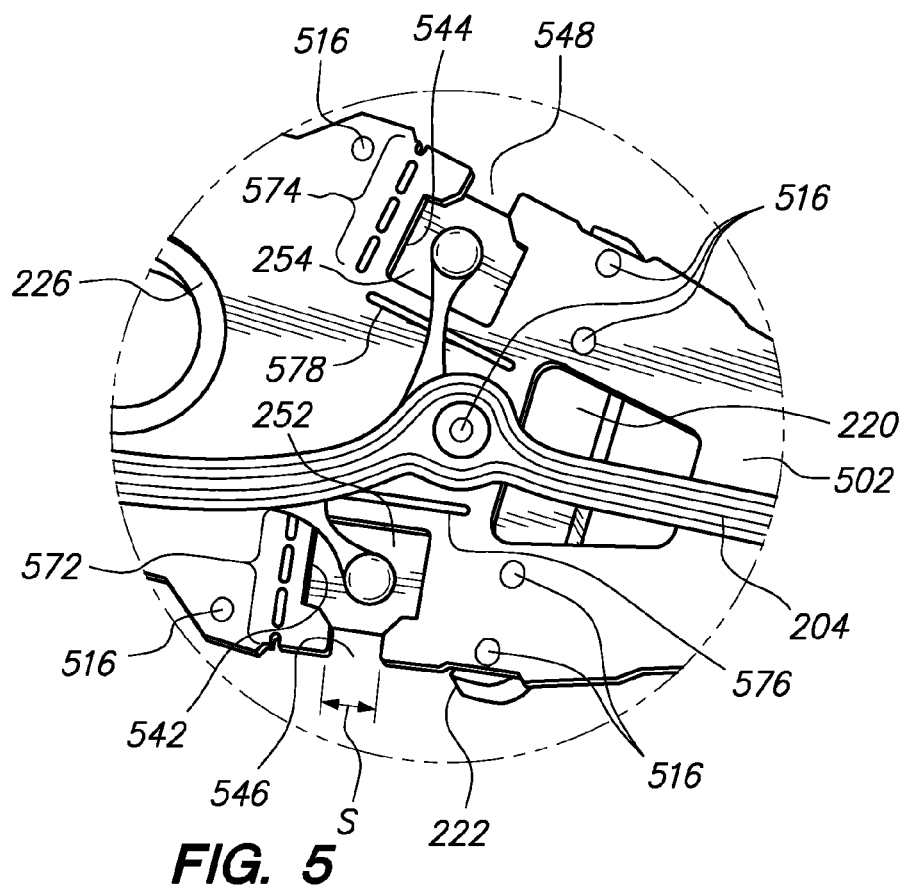
FIG. 5 is a bottom view of a portion of an HGA that includes a microactuator according to an embodiment of the present invention.

FIG. 5 is a bottom view of a portion of an HGA, the view being similar to FIG. 3 except according to a different embodiment of the present invention. To avoid repetition and to enhance the conciseness of this description, sub-components that are labeled with numbers that have already been described with reference to FIG. 3 may not be described again with reference to FIG. 5.

In the embodiment of FIG. 5, the load beam 502 may be attached to a mounting plate 220 via one or more of a plurality of spot welds 516. The load beam 502 and mounting plate 220 may be made of stainless steel, for example, and the mounting plate 220 may include an annular swage boss 226 to facilitate attachment of the suspension assembly to an actuator arm (e.g. actuator arm 114) by the well-known conventional attachment process known as swaging. As in FIG. 3, a first piezoelectric element 252 is disposed within a first piezoelectric element receiving window 222 in the mounting plate 220.

In the embodiment of FIG. 5, the load beam 502 includes a first etched region 572 that comprises a pattern of through slots that are aligned and elongated in a transverse direction. As shown in FIG. 5, the first etched region 572 neighbors the first piezoelectric element 252. Preferably but not necessarily, the first etched region 572 (including its entire pattern of through slots) may have a total lateral span of 0.5 to 1.25 times that of the first piezoelectric element 252. The first etched region 572 is also shown to be located closer to the actuator arm (which would lie to the left of the swage boss 226 in FIG. 5) than is the first piezoelectric element 252. Specifically, this can be seen because the first etched region 572 is shown in FIG. 5 to be located closer to the swage boss 226 (to which the actuator arm is connected) than is the first piezoelectric element 252. In certain embodiments, such positioning and preferred range of lateral span may advantageously reduce the stress experienced by the first piezoelectric element 252, and thereby enhance disk drive reliability by delaying or avoiding fractures in the first piezoelectric element 252.

Likewise, in the embodiment of FIG. 5, the HGA is depicted to also include a second piezoelectric element 254 disposed within a second piezoelectric element receiving window in the mounting plate 220. The load beam 502 includes a second etched region 574 that comprises a pattern of through slots that are aligned and elongated in a transverse direction. As shown in FIG. 5, the second etched region 574 neighbors the second piezoelectric element 254. Preferably but not necessarily, the second etched region 574 (including its entire pattern of through slots) may have a total lateral span of 0.5 to 1.25 times that of the second piezoelectric element 254. The second etched region 574 is also shown in FIG. 5 to be located closer to the actuator arm than is the second piezoelectric element 254. This can be seen because the second etched region 574 is shown in FIG. 5 to be located closer to the swage boss 226 (to which the actuator arm is connected) than is the second piezoelectric element 254. Note that the actuator arm would lie to the left of the swage boss 226 in FIG. 5. In certain embodiments, such positioning and preferred range of lateral span may advantageously reduce the stress experienced by the second piezoelectric element 254, and thereby enhance disk drive reliability by delaying or avoiding fractures in the second piezoelectric element 254.

In the embodiment of FIG. 5, the load beam 502 further includes a third etched region 576 that is elongated in the longitudinal direction. The third etched region 576 preferably neighbors the first piezoelectric element 252 and is preferably disposed closer to a bisecting centerline of the load beam 502 than is the first piezoelectric element 252. Note that, in the present embodiment, the bisecting centerline would be parallel to the longitudinal direction (e.g. coincident with the longitudinal direction 296 shown in FIG. 2).

Likewise, in the embodiment of FIG. 5, the load beam 502 further includes a fourth etched region 578 that is elongated in the longitudinal direction. The fourth etched region 578 preferably neighbors the second piezoelectric element 254 and is preferably disposed closer to a bisecting centerline of the load beam 502 than is the second piezoelectric element 254.

In the context of the embodiment of FIG. 5, the third and fourth etched regions 576, 578 are regions in which material has been removed, causing a recession in the surface or a through opening (e.g. a through slot). For example, a surface that is flush with the surrounding material does not qualify as an "etched region."

In the embodiment of FIG. 5, the third and fourth etched regions 576, 578 are through slots, but in an alternative embodiment they may be partially-etched trenches that do not extend all the way through the material of the load beam 502. In either of these two specific embodiments, the third and fourth etched regions 576, 578 are regions in which material has been removed, causing a recession in the surface or a through opening. Preferably but not necessarily, the third and fourth etched regions 576, 578 may each have a longitudinal span of 0.5 to 1.5 times that of the first or second piezoelectric element 252, 254, respectively. In certain embodiments, the aforementioned positioning and preferred range of longitudinal span may advantageously reduce the stress experienced by the first and second piezoelectric elements 252, 254 and thereby enhance disk drive reliability by delaying or avoiding fractures in the first and second piezoelectric elements 252, 254.

In the embodiment of FIG. 5, the load beam 502 preferably includes a through-opening over the first piezoelectric element 252. In the embodiment of FIG. 5, the through-opening has an inner periphery 542 that includes a gap 546 that is disposed along an outer edge of the first piezoelectric element 252. Such outer edge faces away from a bisecting centerline of the load beam 502 that is parallel to the longitudinal direction (e.g. coincident with the longitudinal direction 296 shown in FIG. 2). In the embodiment of FIG. 5, the gap 546 has a span S that is preferably no more than half of a length of the first piezoelectric element 252 measured in the longitudinal direction.

In certain embodiments, the largest face of the first piezoelectric element 252 defines a piezoelectric element surface area, and the load beam 502 overlaps the first piezoelectric element 252 by an overlap area that is preferably in the range 10% to 40% of the piezoelectric element surface area. In certain embodiments, the aforementioned gap span and overlap area ranges may advantageously enhance the stroke versus bandwidth tradeoff for fine actuation by the first piezoelectric element 252, while acceptably meeting mechanical shock robustness requirements.

In the embodiment of FIG. 5, the load beam 502 preferably likewise includes a through-opening over the second piezoelectric element 254. In the embodiment of FIG. 5, the through-opening has an inner periphery 544 that includes a gap 548 that is disposed along an outer edge of the second piezoelectric element 254. Such outer edge faces away from a bisecting longitudinal centerline of the load beam 502. In the embodiment of FIG. 5, the gap 248 preferably spans no more than half of a length of the second piezoelectric element 254 measured in the longitudinal direction. In certain embodiments, the foregoing gap span range may advantageously enhance the stroke versus bandwidth tradeoff for fine actuation by the second piezoelectric element 254, while acceptably meeting mechanical shock robustness requirements.

Figure 6:
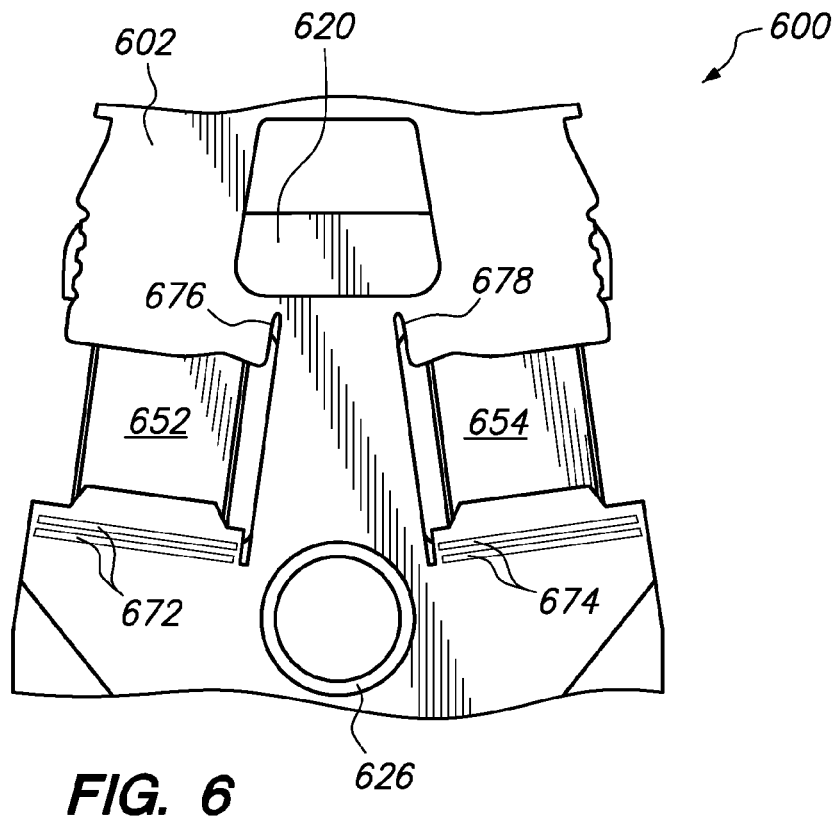
FIG. 6 is a bottom view of a portion of an HGA that includes a microactuator according to an embodiment of the present invention.
Figure 7:
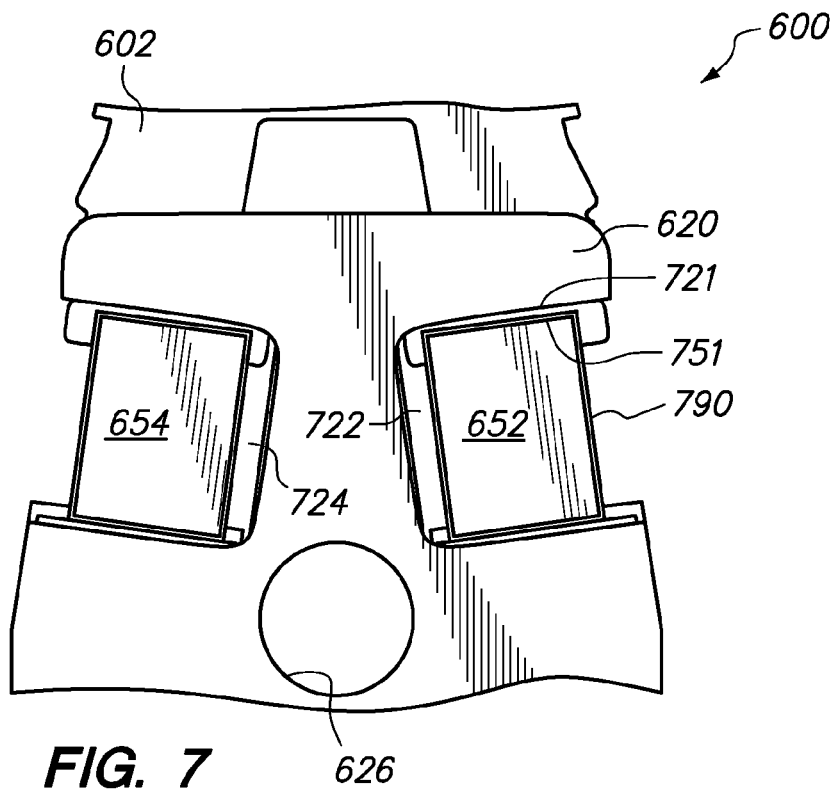
FIG. 7 is a top view of a portion of an HGA that includes a microactuator according to an embodiment of the present invention.

FIG. 6 is a bottom view of a portion of an HGA 600 that includes a microactuator according to an embodiment of the present invention. FIG. 7 is a top view of the portion of the HGA 600. In the embodiment of FIGS. 6-7, a load beam 602 is attached to a mounting plate 620. The mounting plate 620 may include an annular swage boss 626 to facilitate attachment of the suspension assembly to an actuator arm. A first piezoelectric element 652 is disposed within a first piezoelectric element receiving window 722 in the mounting plate 620. A second piezoelectric element 654 is disposed within a second piezoelectric element receiving window 724 in the mounting plate 620.

In the embodiment of FIGS. 6-7, the load beam 602 includes a first etched region 672 that comprises a pair of partially-etched trenches that are aligned and elongated in a transverse direction. As shown in FIGS. 6-7, the first etched region 672 neighbors the first piezoelectric element 652. Preferably but not necessarily, the first etched region 672 may have a total lateral span of 0.5 to 1.25 times that of the first piezoelectric element 652. The first etched region 672 is also shown to be located closer to the actuator arm (which would lie below the swage boss 626 in FIGS. 6-7) than is the first piezoelectric element 652. Specifically, this can be seen because the first etched region 672 is shown in FIGS. 6-7 to be located closer to the swage boss 626 (to which the actuator arm is connected) than is the first piezoelectric element 652. In certain embodiments, such positioning and preferred range of lateral span may advantageously reduce the stress experienced by the first piezoelectric element 652, and thereby enhance disk drive reliability by delaying or avoiding fractures in the first piezoelectric element 652.

Likewise in the embodiment of FIGS. 6-7, the load beam 602 includes a second etched region 674 that comprises a pair of partially-etched trenches that are aligned and elongated in a transverse direction. As shown in FIGS. 6-7, the second etched region 674 neighbors the second piezoelectric element 654. Preferably but not necessarily, the second etched region 674 may have a total lateral span of 0.5 to 1.25 times that of the second piezoelectric element 654. The second etched region 674 is also shown to be located closer to the actuator arm (which would lie below the swage boss 626 in FIGS. 6-7) than is the second piezoelectric element 654. Specifically, this can be seen because the second etched region 674 is shown in FIGS. 6-7 to be located closer to the swage boss 626 (to which the actuator arm is connected) than is the second piezoelectric element 654. In certain embodiments, such positioning and preferred range of lateral span may advantageously reduce the stress experienced by the second piezoelectric element 654, and thereby enhance disk drive reliability by delaying or avoiding fractures in the second piezoelectric element 654.

In the embodiment of FIGS. 6-7, the load beam 602 further includes a third etched region 676 that is elongated in the longitudinal direction. The third etched region 676 preferably neighbors the first piezoelectric element 652 and is preferably disposed closer to a bisecting centerline of the load beam 602 than is the first piezoelectric element 652. Likewise, in the embodiment of FIGS. 6-7, the load beam 602 further includes a fourth etched region 678 that is elongated in the longitudinal direction. The fourth etched region 678 preferably neighbors the second piezoelectric element 654 and is preferably disposed closer to a bisecting centerline of the load beam 602 than is the second piezoelectric element 654.

In certain embodiments, the largest face of the first piezoelectric element 652 defines a piezoelectric element surface area, and the load beam 602 overlaps the first piezoelectric element 652 by an overlap area that is preferably in the range 10% to 40% of the piezoelectric element surface area. Likewise, the load beam 602 may optionally overlap the second piezoelectric element 654 by an overlap area that is preferably in the range 10% to 40% of the piezoelectric element surface area. In certain embodiments, such overlap area ranges may advantageously enhance the stroke versus bandwidth tradeoff for fine actuation by the first and second piezoelectric elements 652, 654, while acceptably meeting mechanical shock robustness requirements.

In the embodiment of FIGS. 6-7, the first piezoelectric element 652 may optionally be rectangular in shape, with four edges that are encapsulated by an encapsulate 790 (e.g. an electrically non-conductive encapsulate such as an epoxy). Preferably but not necessarily, the two longitudinal edges of the first piezoelectric element 652 may each be bonded by an adhesive to corresponding edges of the mounting plate 620 that face into the first piezoelectric element receiving window 722. For example, the longitudinal edge 751 of the first piezoelectric element 652 may be bonded by an adhesive to the corresponding edge 721 of the mounting plate 620 (the edge 721 of the mounting plate 620 shown to face into the first piezoelectric element receiving window 722).

In certain embodiments, the adhesive used to bond the first and second piezoelectric elements 652, 654 to the mounting plate 620 and/or the load beam 602 may be an electrically non-conductive cyanoacrylate, epoxy, polyimide, and/or acrylic adhesive. Non-conductivity of such adhesive may be advantageous in certain embodiments where electrode layers of the piezoelectric elements 652, 654 might otherwise be shorted, though a conductive adhesive might provide advantageous grounding in certain other embodiments (e.g. where a coating or encapsulant on the piezoelectric elements 652, 654 effectively prevents shorting).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a spindle attached to the disk drive base;
   a disk mounted on the spindle;
   a first actuator pivotally attached to the disk drive base, the first actuator including a conductive coil and an actuator arm; and
   a head suspension assembly comprising
      a mounting plate attached to the actuator arm;
      a load beam attached to and extending from the mounting plate in a longitudinal direction;
      a first piezoelectric element disposed within a first piezoelectric element receiving window in the mounting plate;
      wherein the load beam includes a first etched region that is elongated in a transverse direction that is transverse to the longitudinal direction, the first etched region neighboring the first piezoelectric element and being disposed closer to the actuator arm than is the first piezoelectric element; and
   a read head supported by the load beam and disposed adjacent a surface of the disk.

2. The disk drive of claim 1 wherein the first etched region is a slot opening.

3. The disk drive of claim 1 wherein the first etched region is a partially-etched trench.

4. The disk drive of claim 1 wherein the first etched region has a lateral span of 0.5 to 1.25 times that of the first piezoelectric element.

5. The disk drive of claim 1 wherein the HGA further comprises a second piezoelectric element disposed within a second piezoelectric element receiving window in the mounting plate; and wherein the load beam includes a second etched region that is elongated in a transverse direction that is transverse to the longitudinal direction, the second etched region neighboring the second piezoelectric element and being disposed closer to the actuator arm than is the second piezoelectric element.

6. The disk drive of claim 5 wherein the second etched region is a slot opening.

7. The disk drive of claim 5 wherein the second etched region is a partially-etched trench.

8. The disk drive of claim 5 wherein the load beam further includes a third etched region that is elongated in the longitudinal direction, the third etched region neighboring the first piezoelectric element and being disposed closer to a bisecting centerline of the load beam than is the first piezoelectric element, the bisecting centerline being parallel to the longitudinal direction.

9. The disk drive of claim 8 wherein the third etched region is a slot opening.

10. The disk drive of claim 8 wherein the third etched region is a partially-etched trench.

11. The disk drive of claim 8 wherein the third etched region has a longitudinal span of 0.5 to 1.5 times that of the first piezoelectric element.

12. The disk drive of claim 1 wherein the load beam includes a through-opening over the first piezoelectric element, the through-opening having an inner periphery that includes a gap that is disposed along an outer edge of the first piezoelectric element, the outer edge facing away from a bisecting centerline of the load beam that is parallel to the longitudinal direction, the gap spanning no more than half of a length of the first piezoelectric element measured in the longitudinal direction.

13. The disk drive of claim 1 wherein a largest face of the first piezoelectric element defines a first piezoelectric element surface area, and the load beam overlaps the first piezoelectric element by an overlap area that is in the range 10% to 40% of the first piezoelectric element surface area.

14. The disk drive of claim 1 wherein the first piezoelectric element comprises a piezoelectric material selected from the group consisting of lead zirconate titanate, lead scandium tantalite, lanthanum gallium silicate, lithium tantalite, barium titanate, gallium phosphate and potassium sodium tartrate.

15. The disk drive of claim 1 wherein the first piezoelectric element is rectangular having four edges that are encapsulated by an encapsulate, the four edges consisting of two transverse edges and two longitudinal edges, and wherein the two longitudinal edges are bonded by an adhesive to corresponding edges of the mounting plate that face into the first piezoelectric element receiving window.

16. The disk drive of claim 15 wherein the adhesive is selected from the group consisting of cyanoacrylates, epoxies, polyimide adhesives, and acrylic adhesives, and wherein the encapsulate is electrically non-conductive epoxy.

17. A head suspension assembly comprising:
a mounting plate that includes an annular swage boss;
a load beam attached to and extending from the mounting plate in a longitudinal direction; and
a first piezoelectric element disposed within a first piezoelectric element receiving window in the mounting plate;
wherein the load beam includes a first etched region that is elongated in a transverse direction that is transverse to the longitudinal direction, the first etched region neighboring the first piezoelectric element and being disposed closer to the annular swage boss than is the first piezoelectric element.

18. The head suspension assembly of claim 17 wherein the first etched region is a slot opening.

19. The head suspension assembly of claim 17 wherein the first etched region is a partially-etched trench.

20. The head suspension assembly of claim 17 wherein the first etched region has a lateral span of 0.5 to 1.25 times that of the first piezoelectric element.

21. The head suspension assembly of claim 17 wherein a largest face of the first piezoelectric element defines a first piezoelectric element surface area, and the load beam overlaps the first piezoelectric element by an overlap area that is in the range 10% to 40% of the first piezoelectric element surface area.

* * * * *